United States Patent [19]
Van Lieshout

[11] Patent Number: 6,119,997
[45] Date of Patent: Sep. 19, 2000

[54] ASSEMBLY SUITABLE FOR SUPPORTING AN ELECTRONIC APPLIANCE, AS WELL AS A COUPLING PIECE

[75] Inventor: Petrus Theodorus Wilhelmus Maria Van Lieshout, Eindhoven, Netherlands

[73] Assignee: Vogel's Holding B.V., Eindhoven, Netherlands

[21] Appl. No.: 08/894,401

[22] PCT Filed: Feb. 16, 1996

[86] PCT No.: PCT/NL96/00076

§ 371 Date: Oct. 13, 1997

§ 102(e) Date: Oct. 13, 1997

[87] PCT Pub. No.: WO96/25620

PCT Pub. Date: Aug. 22, 1996

[30] Foreign Application Priority Data

Feb. 17, 1995 [NL] Netherlands ............................ 9500300

[51] Int. Cl.$^7$ ................................................. A47H 1/10
[52] U.S. Cl. ........................................ 248/323; 248/282.1
[58] Field of Search ...................................... 248/323, 324, 248/318, 326, 393, 397, 918, 282.1, 278.1, 289.11; 403/383, 94, 93, 97, 119

[56] References Cited

U.S. PATENT DOCUMENTS

| 2,257,350 | 9/1941 | Siebert | 403/94 |
|---|---|---|---|
| 3,385,929 | 5/1968 | Magyar | 179/1 |
| 4,582,445 | 4/1986 | Warshawsky | 403/97 |
| 4,768,744 | 9/1988 | Leeds et al. | 248/280.1 |
| 4,771,273 | 9/1988 | Test et al. | 340/693 |
| 4,834,573 | 5/1989 | Asano et al. | 403/344 |
| 5,190,390 | 3/1993 | Ming-Tai | 403/24 |
| 5,398,901 | 3/1995 | Brodmann et al. | 248/288.1 |
| 5,429,119 | 7/1995 | Griffin et al. | 600/200 |
| 5,551,745 | 9/1996 | Huang | 296/111 |
| 5,655,833 | 8/1997 | Raczynski | 362/419 |

FOREIGN PATENT DOCUMENTS

| 0516475 | 12/1992 | European Pat. Off. . |
|---|---|---|
| 0596609 | 5/1994 | European Pat. Off. . |

*Primary Examiner*—Leslie A. Braun
*Assistant Examiner*—Kimberly Wood
*Attorney, Agent, or Firm*—Ladas & Parry

[57] ABSTRACT

An assembly suitable for supporting an electronic appliance, which assembly comprises a bracket to be fixed to a wall or a ceiling and a supporting platform, which is pivotable connected to one end of the bracket by means of a coupling piece. The coupling piece is provided with a rectangular blind recess in which the rectangular end of the bracket is positioned, whereby the rectangular end is fully embraced by the coupling piece.

8 Claims, 2 Drawing Sheets

ASSEMBLY SUITABLE FOR SUPPORTING AN ELECTRONIC APPLIANCE, AS WELL AS A COUPLING PIECE

This application is the national stage completion in the United States, under 35 USC 371, of International Application PCT/NL96/00076, filed Feb. 16, 1996.

BACKGROUND OF THE INVENTION

The invention relates to an assembly suitable for supporting an electronic appliance, said assembly comprising a bracket to be fixed to a wall or a ceiling and a supporting platform, which is pivotably connected to one end of said bracket by means of a coupling piece.

The invention furthermore relates to a coupling piece of this type.

With a known assembly of this type a bracket is fixed with one end to a fixed surface, for example a wall or a ceiling, and an electronic appliance is placed on a supporting platform, which is connected to another end of said bracket via a coupling piece. The supporting platform extends substantially vertically and is capable of rotating movement about a vertical axis and tilting movement about a horizontal axis. The metal bracket extends substantially horizontally near the supporting platform. The end of the metal bracket is welded to the metal coupling piece. A drawback of the known assembly is that the end of the bracket must first be adapted to the shape of the tubular coupling piece and subsequently be welded to the coupling piece.

The object of the invention is to provide an assembly wherein the coupling piece can be connected to the end of the bracket in a simple manner.

This object is achieved by the assembly according to the invention in that said coupling piece is provided with a rectangular blind recess, in which the rectangular end of the bracket is positioned, whereby said rectangular end is fully embraced by said coupling piece.

The rectangular end of the bracket is simply moved into the rectangular recess, after which the coupling piece is secured to the end, for example by means of a bolt and a nut. The coupling piece forms a solid transition between the bracket and the supporting platform and furthermore serves as a finish of the end of the bracket. The coupling piece can be simply produced of plastic material by means of an injection molding technique, for example.

It is noted that from European Patent Application EP-A1-0 596 609 an assembly is known wherein the bracket extends through two opposite rectangular recesses in the coupling piece. A drawback of such a coupling piece is that the provision of two rectangular recesses positioned exactly opposite each other is a relatively labor-intensive and costly process. Furthermore the end of the bracket extending through the bracket requires careful finishing, because it constitutes a visible part of the assembly and because the risk of a person injuring himself when bumping into the end of the bracket must be prevented. The separate finishing of the end of the bracket makes the assembly relatively costly.

With the assembly according to the invention the end of the bracket is fully surrounded by the coupling piece, so that it is not necessary to finish the end.

It is furthermore noted that from U.S. Pat. No. 3,385,929 an assembly is known wherein the bracket is positioned in a slot in the coupling piece. The coupling piece is open at one side facing away from the supporting platform. The end of the bracket is thus visible and requires careful finishing.

SUMMARY OF THE INVENTION

One embodiment of the assembly according to the invention is characterized in that the coupling piece comprises two opposite parts being identical in shape, each part being provided with a rectangular slot, whereby the opposite slots comprise said rectangular blind recess.

The parts can be simply provided around the end of the bracket and be secured to the bracket. Producing said two parts is simpler that producing a one-piece coupling piece, but an extra assembling operation is required.

Another embodiment of the assembly according to the invention is characterized in that the bracket comprises a round tube, one end of which is formed into said rectangular end.

In this manner also a bracket made of a round tube can be connected to a supporting platform via a coupling piece. If the coupling piece would be provided with a circular recess, the orientation of the coupling piece with respect to the bracket would not be unequivocally fixed. Furthermore, additional demands would be made with regard to the properties of the material of the coupling piece, since the coupling piece would not only be loaded in pressure but also in shear and rotation in that case.

Another embodiment of the assembly according to the invention is characterized in that the coupling piece is provided with flanges which at least partially surround the round tube.

The flanges function as guides when the rectangular end of the round tube is being inserted into the coupling piece.

BRIEF DESCRIPTION OF THE DRAWINGS

The invention will be explained in more detail with reference to the drawings, in which likewise parts are numbered alike.

DETAILED DESCRIPTION

Figure 1:
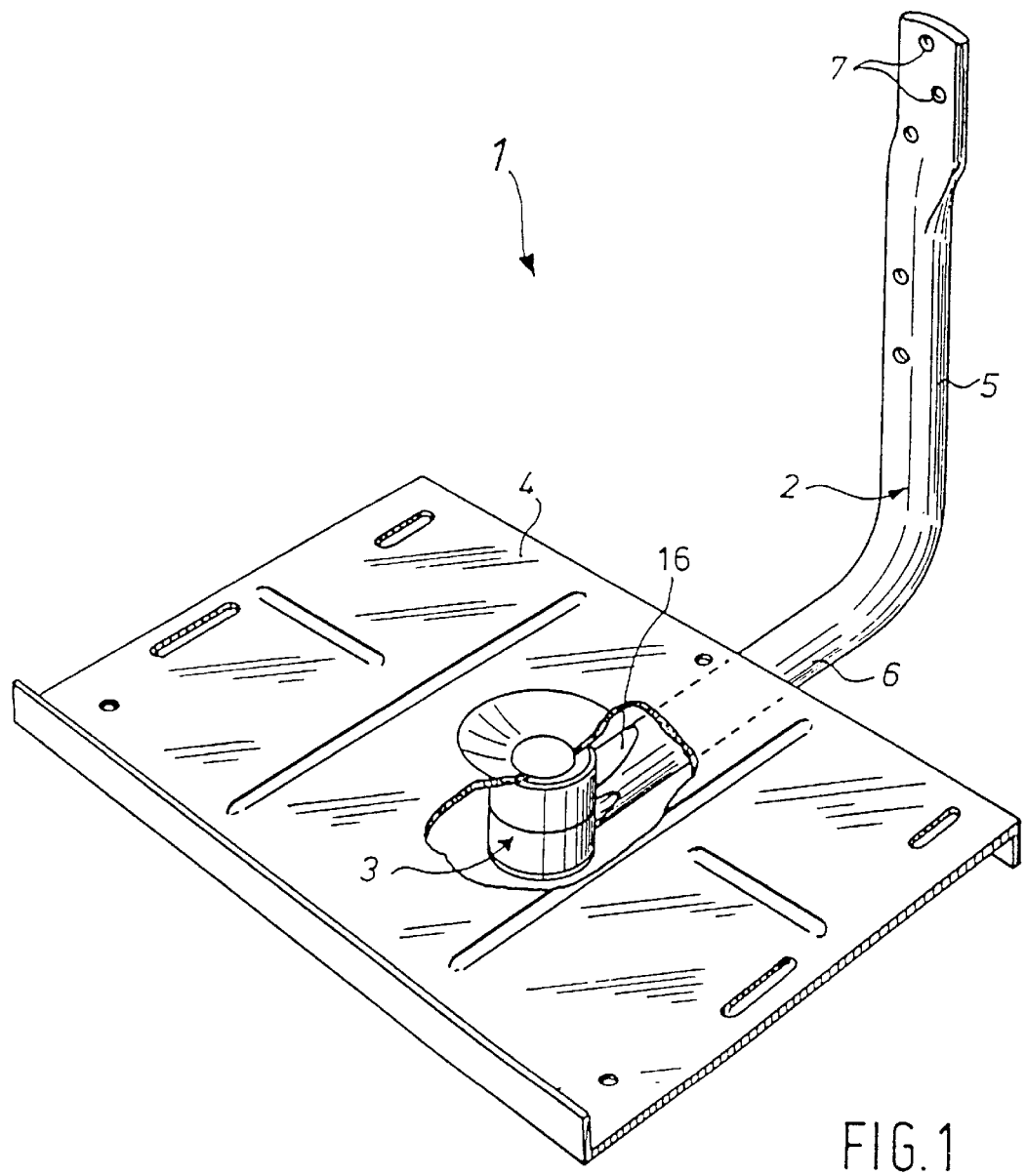
FIG. 1 shows an assembly according to the invention.
Figure 2:
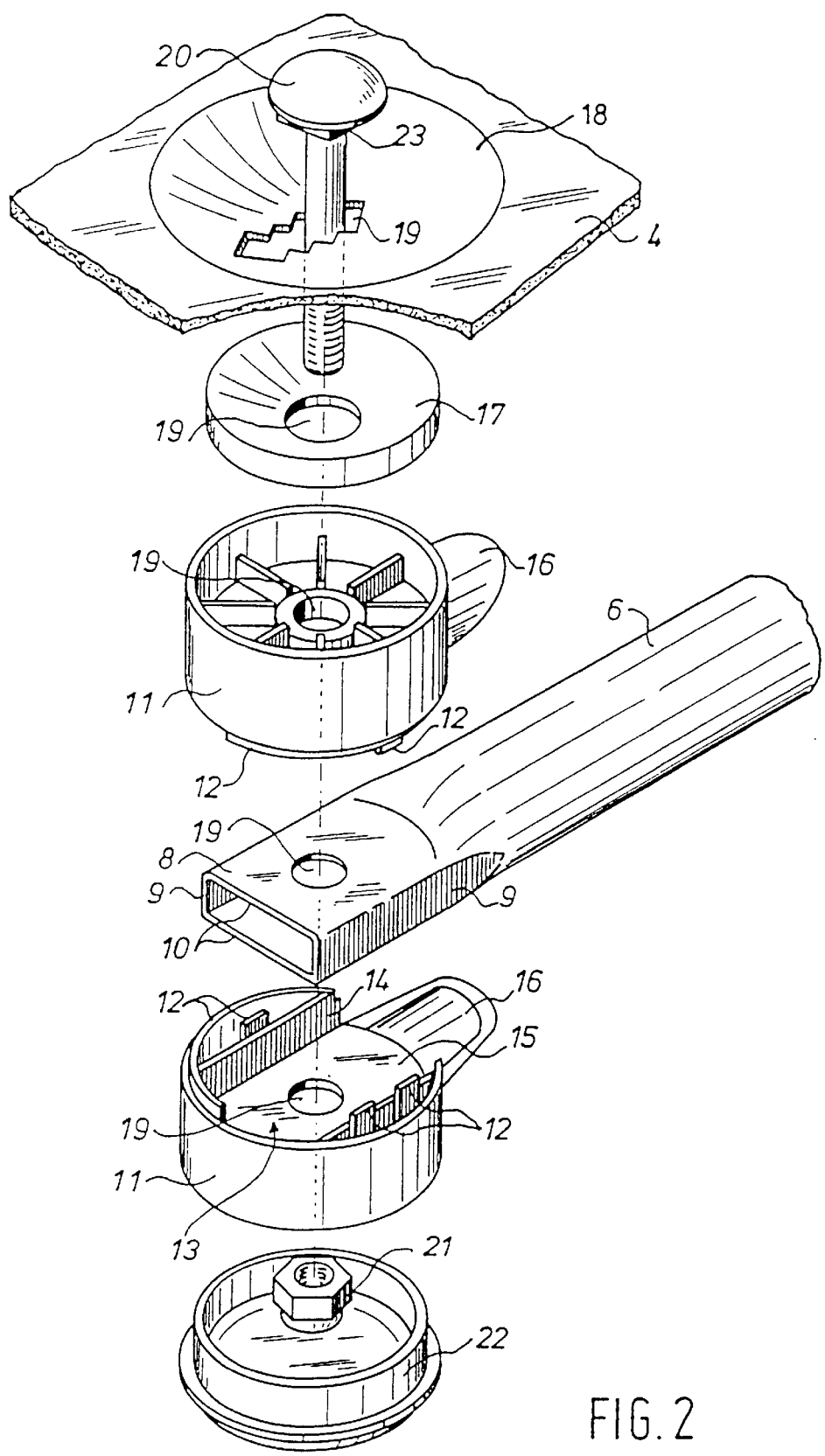
FIG. 2 shows an exploded perspective detail of the assembly of FIG. 1.

FIG. 1 shows an assembly 1 according to the invention, which comprises a bracket 2 and a supporting platform 4 connected to the bracket 2 via a coupling piece 3. The bracket 2 is made of a round metal tube, which is bent through an angle of 90°, thus forming two tubes 5, 6. The bracket 2 comprises the vertically extending tube 5, which is provided with fixing holes 7, via which the bracket 2 can be fixed to a wall. The bracket 2 furthermore comprises the horizontal tube 6 extending perpendicularly to the vertical tube 5, said tube 6 being connected to the coupling piece 3 at one end 8 remote from the vertical tube 5. The part of the assembly 1 positioned near the coupling piece 3 is shown in more detail in an exploded view in FIG. 2.

The round tube 6 is formed into a rectangular shape at the end 8, whereby walls 9, 10 of the rectangular formed section extend vertically and horizontally respectively.

The coupling piece 3 comprises two opposite plastic parts 11 being identical in shape, whereby the parts 11 are provided with lips 12, which engage each other complementarily in an assembled coupling piece 3. Each part 11 is furthermore provided with a rectangular end 8 in such a manner that the walls 9, 10 of the end 8 abut against the walls 14, 15 of the recess with an assembled coupling piece. Each part 11 comprises a flange 16 which extends in the direction of the vertical tube 5 and which partially surrounds the horizontal tube 6. The coupling piece 3 furthermore comprises a ring 17, which is positioned between the parts 11 and the supporting platform 4, which is flat at a side facing the parts 11 and which is bowl-shaped at a side facing the supporting platform 4. The supporting platform 4 is provided with an indentation 18, which is complementary to the bowl-shaped part of the ring 17. The various components of the assembly 1 are provided with holes 19, through which a bolt 20 is passed. A nut 21 is screwed onto the end of a said bolt 20, as a result of which the supporting platform 4, the coupling piece 3 and the tube 6 are firmly interconnected. In order to hide the nut 21 from sight the coupling piece 3 is provided with a cap 22, which engages into the bottom part 11 under spring force.

Before the nut 21 is tightened, the desired amount of rotation and tilt of the supporting platform 4 with respect to the tube 6 is set. The opening 19 in the supporting platform 4 is provided with a number of connected square openings, in which a square flange 23 of the bolt 20 engages. The amount of tilt of the platform 4 depends on the square opening that is selected. A television may be placed on the supporting platform 4, for example.

Instead of providing a cap 22 it is also possible to secure a supporting structure to the bolt 20, in which a video recorder may be placed, for example.

It is also possible to make the coupling piece 3 in one piece, for example by means of an injection molding technique.

I claim:

1. An assembly for supporting an appliance, said assembly comprising:
   a surface mounting bracket having a surface attachment portion for attachment to a fixed surface, and a coupler attachment portion terminating in an end, the coupler attachment end including a shaft with a longitudinal axis and having a substantially rectangular shape in cross-section perpendicular to the shaft axis;
   a rotatable supporting platform for the appliance; and
   a coupling piece including:
      a rectangular blind recess which extends into the coupling piece but does not extend therethrough, and
      a fastening mechanism for pivotably connecting the coupling piece to the supporting platform;
   wherein the surface mounting bracket rectangular coupler attachment end is positioned within and fully embraced by the rectangular blind recess of the coupling piece.

2. An assembly according to claim 1, wherein the coupling piece includes two substantially identical subparts each having a rectangular slot, the two coupling piece subparts being mated with their rectangular slots adjacent each other such that the two rectangular slots together form the rectangular blind recess.

3. An assembly according to claim 1 wherein the surface mounting bracket includes a tube, the tube having a round portion adjacent an end which is formed into the rectangular coupler attachment end.

4. An assembly according to claim 2 wherein the surface mounting bracket includes a tube, the tube having a round portion adjacent an end which is formed into the rectangular coupler attachment end.

5. An assembly according to claim 3 wherein the coupling piece includes flanges located adjacent the blind recess and extending outwardly, such that the flanges at least partially surround the round portion of the surface mounting bracket tube.

6. An assembly according to claim 4 wherein the coupling piece includes flanges located adjacent the blind recess and extending outwardly, such that the flanges at least partially surround the round portion of the surface mounting bracket tube.

7. A mounting bracket coupling assembly comprising a first mounting bracket, a second mounting bracket, and a coupling piece for pivotably coupling said mounting brackets, said coupling piece including:
   a blind recess which extends into the coupling piece but does not extend therethrough, the blind recess having a shaft axis and a rectangular cross-section perpendicular the shaft axis; and
   a fastening mechanism for pivotably connecting the coupling piece to the first mounting bracket;
wherein the rectangular blind recess is functional to receive and fully embrace a mating protrusion having a cross-section matching the rectangular cross-section of the blind recess when such mating protrusion is provided on the second mounting bracket, and to thereby couple the first mounting bracket to the second mounting bracket; and
wherein the coupling piece includes two substantially identical subparts each having a rectangular slot, the two coupling piece subparts being mated with their rectangular slots adjacent each other such that the two rectangular slots together form the rectangular blind recess.

8. A coupling piece according to claim 7, further including flanges located adjacent the blind recess and extending outwardly such that the flanges at least partially surround surfaces of the second mounting bracket.

* * * * *